United States Patent [19]

Sheaffer

[11] Patent Number: 5,048,460

[45] Date of Patent: Sep. 17, 1991

[54] MODULAR ANIMAL KENNEL

[75] Inventor: John E. Sheaffer, Havre de Grace, Md.

[73] Assignee: Lab Products, Inc., Maywood, N.J.

[21] Appl. No.: 360,519

[22] Filed: Jun. 2, 1989

[51] Int. Cl.⁵ .............................................. A01K 1/00
[52] U.S. Cl. .................................................... 119/19
[58] Field of Search ..................... 119/19, 20, 17, 28

[56] References Cited

U.S. PATENT DOCUMENTS

| | | | |
|---|---|---|---|
| 1,259,802 | 3/1918 | John | 119/28 |
| 2,856,897 | 10/1958 | Galinsky et al. | 119/28 |
| 3,116,847 | 1/1964 | Collins | 119/19 |
| 3,195,506 | 7/1965 | Beard | 119/19 |
| 3,234,908 | 2/1966 | Doskocil | 119/19 |
| 3,256,860 | 6/1966 | Parker | 119/19 |
| 3,429,297 | 2/1969 | Schroer | 119/17 |
| 3,541,994 | 11/1970 | Meng et al. | 119/20 |
| 3,550,559 | 12/1970 | Long et al. | 119/20 |
| 3,760,769 | 9/1973 | Erfeling | 119/19 |
| 3,791,347 | 2/1974 | Lovell | 119/17 |
| 3,858,555 | 1/1975 | Smith | 119/20 |
| 3,866,577 | 2/1975 | Mathis | 119/19 |
| 3,905,333 | 9/1975 | Uhrig | 119/19 |
| 4,016,833 | 4/1977 | Ray | 119/17 |
| 4,224,899 | 9/1980 | Cruchelow et al. | 119/19 |
| 4,586,463 | 5/1986 | Braeuner | 119/17 |
| 4,696,259 | 9/1987 | Fewox | 119/20 |
| 4,763,606 | 8/1988 | Ondrasik, II | 119/19 |
| 4,819,582 | 4/1989 | Lichvar | 119/17 |

Primary Examiner—Paul J. Hirsch
Attorney, Agent, or Firm—Blum Kaplan

[57] ABSTRACT

A modular animal kennel is provided having a first fixed wall, a second fixed wall and a third fixed wall forming three sides of the kennel. A frame is attached to the open side of the kennel. A removable wall is selectively received with the frame to form the fourth wall of the panel. A floor support member is provided on the frame and at least one other wall for supporting a floor therebetween.

17 Claims, 4 Drawing Sheets

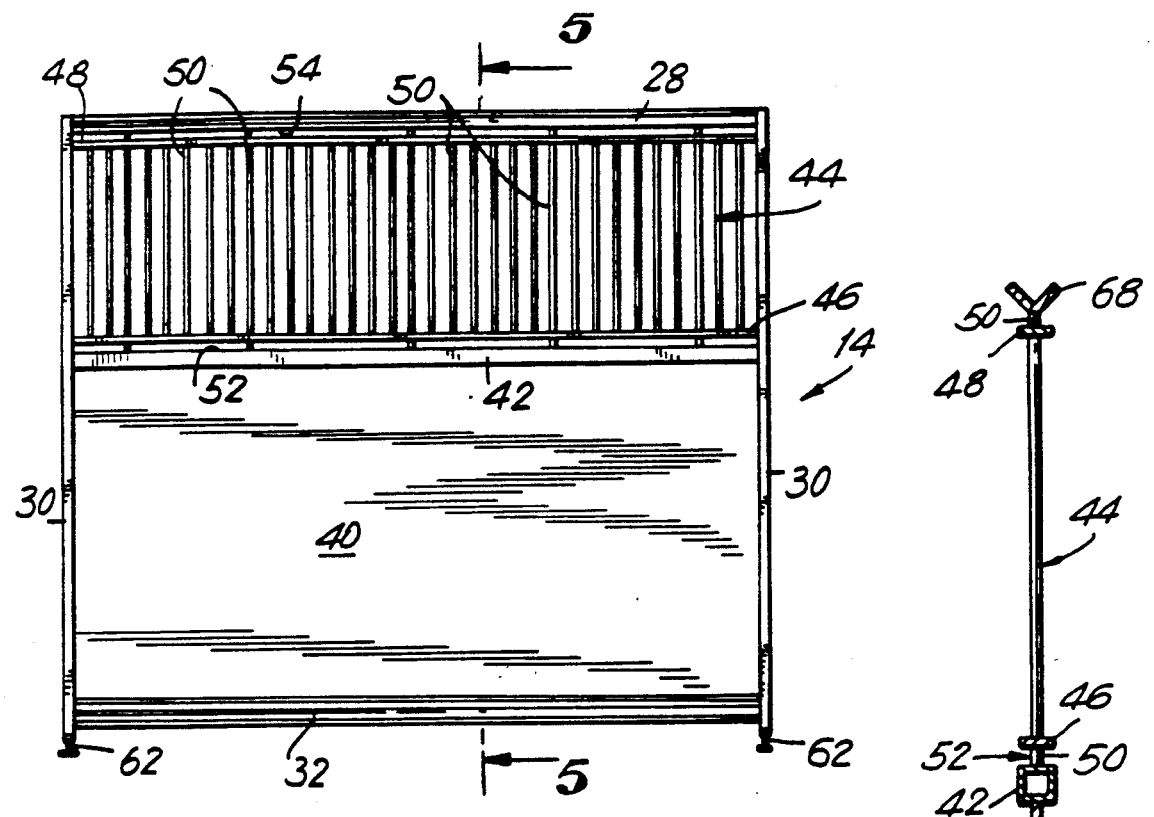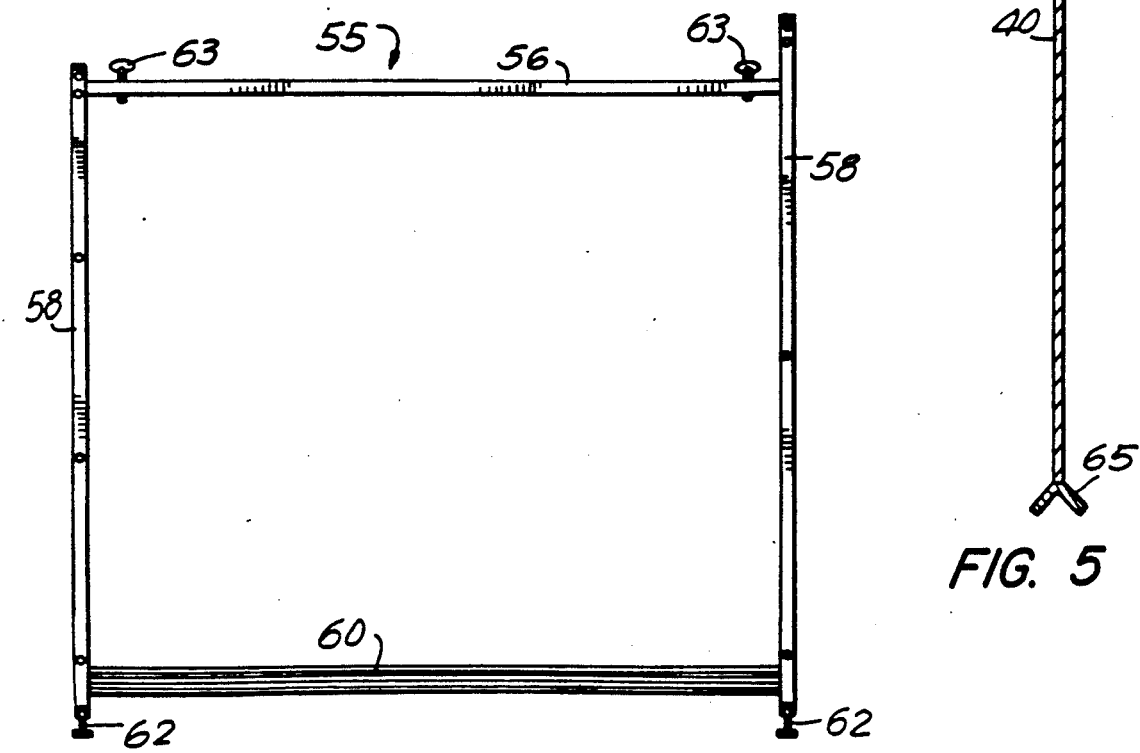

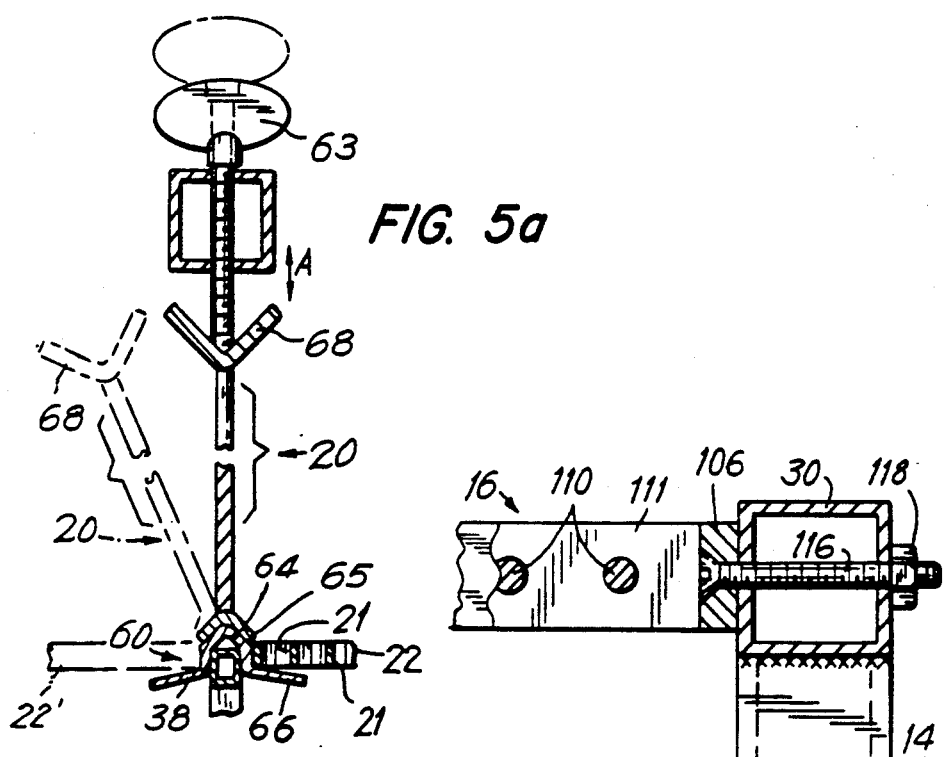
FIG. 5a
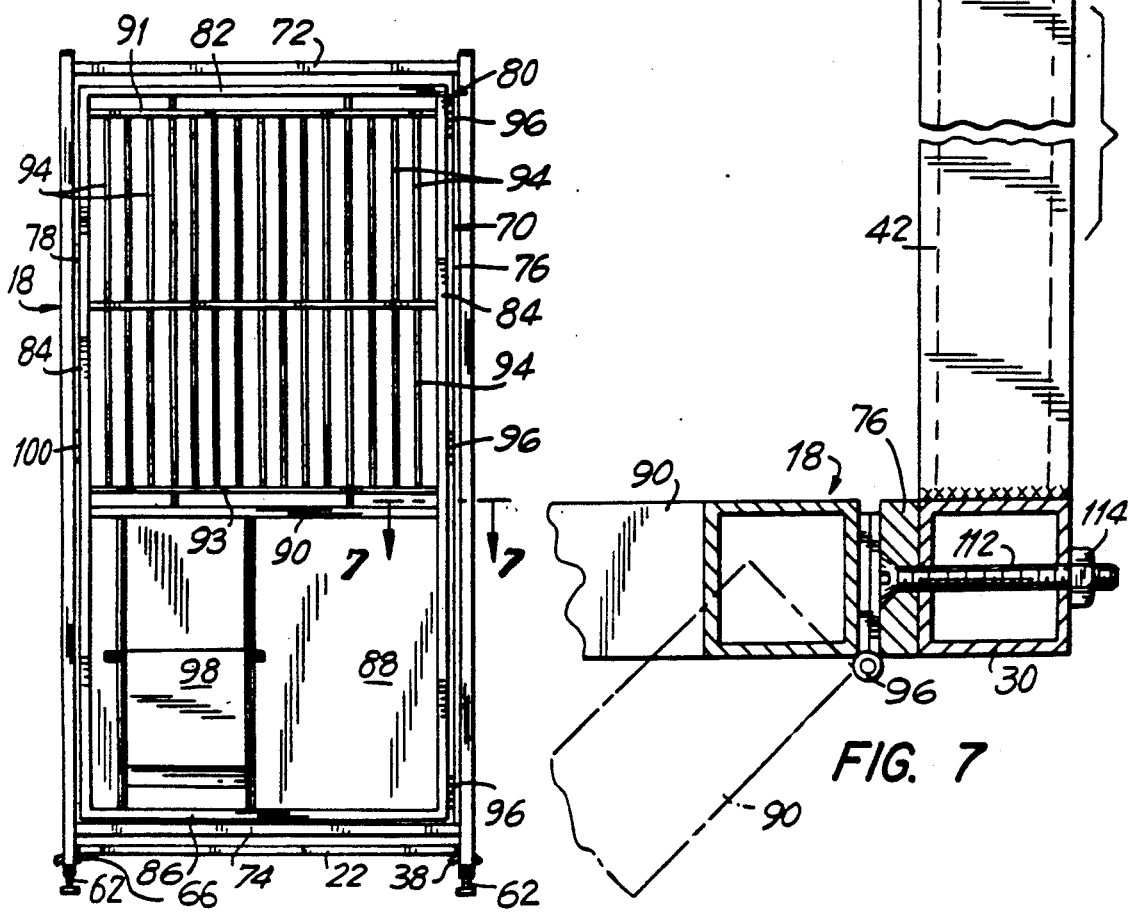
FIG. 6
FIG. 7

MODULAR ANIMAL KENNEL

BACKGROUND OF THE INVENTION

This invention is directed to an animal kennel and, in particular, to a modular animal kennel in which at least one wall is removed to allow combination with other kennels.

Modular kennels are known in the art, such as those sold by Bush Products. The modular kennels sold by Bush Products consist of a skeletal tube frame with each wall being bolted within the tube frame to form the kennel. Other prior art kennels consist of each wall being formed within its own tubular frame and then bolting these wall tubular frames together to form the kennel.

These prior art kennels have been less than completely satisfactory because you must remove the bolts or other permanent fastening means from an intermediate wall to remove the intermediate wall from the frames. Additionally, when walls are to be added which are not of tubular frames each wall requires special adapters to receive the tubular frame. These adapters must also be bolted to the wall being added. Accordingly a modular animal kennel containing at least one intermediate wall which may be positioned within the animal kennel without use of nuts, bolts and other traditional fasteners, and that can be easily removed, and yet will maintain the appearance and provide the function of a fixed wall is provided by the instant invention.

SUMMARY OF THE INVENTION

Generally speaking, in accordance with the instant invention, a modular animal kennel has a first wall, a second wall and a door forming three sides of the kennel. A frame is affixed to the kennel to form the fourth side. A removable wall is releasably mounted within the frame. At least one wall and the frame each include a formed beam. A floor is supported between the formed beams. In an exemplary embodiment a two unit modular kennel is formed by releasing the wall supported within the frame so that the empty frame is used to form the intermediate wall between two adjacent units.

Accordingly, it is an object of the instant invention to provide an improved modular animal kennel.

A further object of the invention is to provide a modular animal kennel having at least one intermediate wall which may be easily positioned within the animal kennel and easily removed from the animal kennel.

Another object of the instant invention is to provide a modular animal kennel having a removable wall which provides the appearance and function of a solid welded wall.

Yet another object of the instant invention is to provide a support beam for a removable wall which also acts to prevent debris from being retained between the wall and the floor.

Still other objects and advantages of the invention will in part be obvious and in part be apparent from the specification.

The invention accordingly comprises the features of construction, combination of elements, and arrangements of parts which will be exemplified by the constructions hereinafter set forth and the scope of the invention will indicated in the claims.

BRIEF DESCRIPTION OF THE DRAWINGS

For a fuller understanding of the invention, reference is had to the following description taken in connection with the accompanying drawings, in which:

FIG. 2 is a front elevational view of a fixed side wall constructed in accordance with the invention;

FIG. 4 is a front elevational view of a removable wall frame constructed in accordance with the invention;

FIG. 5 is a side elevational view of a removable wall constructed in accordance with the invention;

FIG. 5a is a sectional view taken along line 5a—5a of FIG. 1 showing a removable wall being removed in phantom;

FIG. 6 is a front elevational view of the modular animal kennel;

FIG. 7 is a sectional view taken along line 7—7 of FIG. 1;

DETAILED DESCRIPTION OF THE PREFERRED EMBODIMENTS

Figure 1:
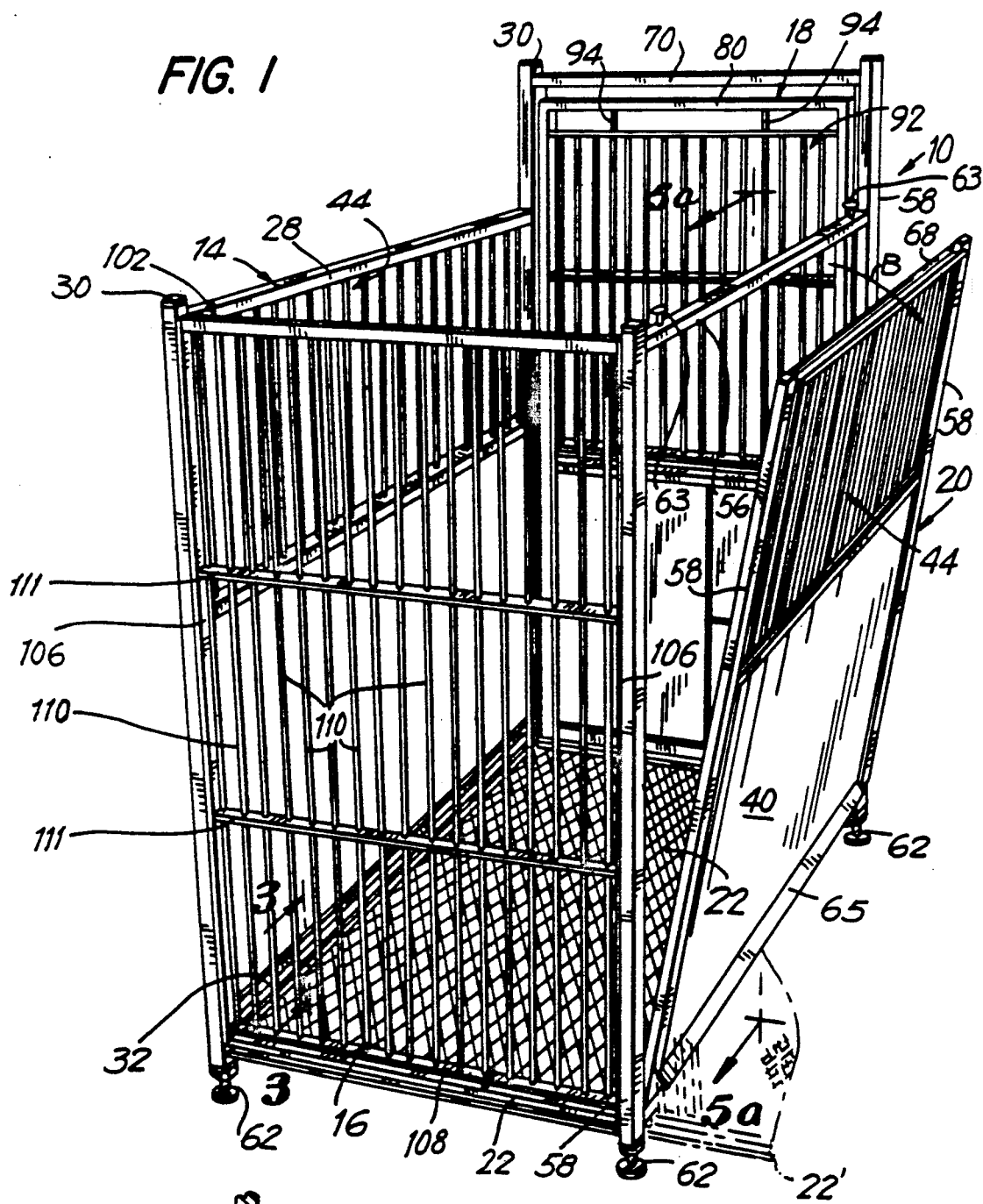
FIG. 1 is a perspective view of a modular animal kennel constructed in accordance with the invention.

Reference is first made to FIG. 1 wherein a modular animal kennel generally indicated as 10 and constructed in accordance with the instant invention is depicted. A fixed side wall 14, a rear wall 16, a door 18 and a removable wall 20 are joined together to form the closed sides of modular animal kennel 10. A floor 22 is supported within modular animal kennel 10 to form a box having an open top.

Figure 3:
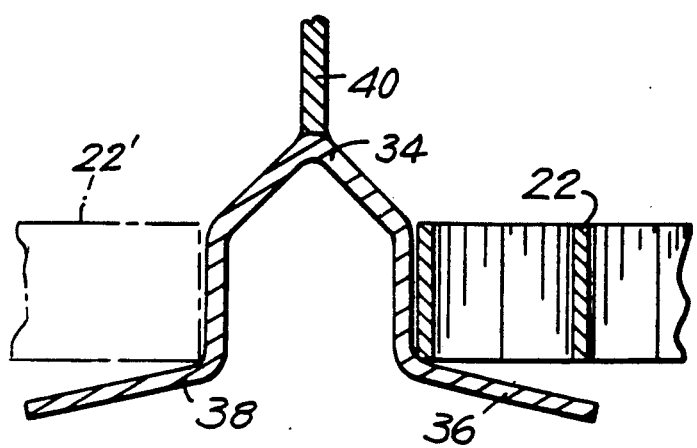
FIG. 3 is a sectional view taken a long line 7—7 of FIG. 6.

Reference is now also made to FIG. 2 in which a front elevational view of fixed side wall 14 is shown. Side wall 14 includes a tubular frame structure which includes a cross bar 28 and uprights 30 extending parallel to each other at a substantially right angle from cross bar 28. A formed bar 32 extends between uprights 30 to form a bottom of frame structure 26. Uprights 30, cross bar 28 and formed bar 32 are welded together to form an integral unitary frame structure. Uprights 30 and cross bar 28 are formed of metal tubing or the like and as can be seen in FIG. 3, formed bar 32 is formed to have rounded top surface 34, a first flange 36 extending from one side of top surface 34 and a second flange 38 extending from the opposite side of top surface 34.

A solid wall panel 40 is welded to top surface 34 of formed bar 32 and to uprights 30 to form a solid panel portion of fixed side wall 14. A cross bar 42 is welded between uprights 30 and is welded to the top of solid wall 40 forming a frame for solid wall 40 within the frame structure. In an exemplary embodiment cross bar 30 is a metallic tube or the like and solid wall panel 40 is formed from sheet metal, such as stainless steel or aluminum.

Fixed side wall 14 includes a grill, generally indicated as 44, which forms the top portion of fixed side wall 14. Grill 44 includes a bottom flat bar 46 and a top flat bar 48. A plurality of rods 50 are positioned between bottom flat bar 46 and top flat bar 48 at spaced intervals to provide the grill opening. Rods 50 are attached to bottom flat bar 46 and top flat bar 48 by plug end welds. Selected rods 50 distanced at predetermined intervals extend through bottom flat bar 46 and top flat bar 48 to provide a spacer for supporting grill 44 between cross bar 42 and cross bar 28. Grill 44 is supported between cross bar 42 and cross bar 28 at a spaced distance forming a bottom gap 52 and a top gap 54. Grill 44 is supported on cross bar 42 across gap 52 to facilitate cleaning of grill 44 and solid wall panel 40 by removing welds between grill 44 and solid wall panel 40. In an exemplary embodiment the rods which extend through top flat bar 48 and bottom flat bar 46 are spaced a distance of 14 inches. Adjustable supports 62 descend from each upright 30 to support modular kennel 10 above the floor.

Reference is now made to FIG. 4, wherein a second frame structure, generally indicated as 55, for receiving removable wall 20 is depicted. Frame 55 is similar in structure to frame structure 26 and includes a cross bar 56 having uprights 58 extending downward therefrom in a parallel relationship at substantially right angles from cross bar 56. A formed bar 60 having the same shape as formed bar 32 extends between uprights 58 to form a bottom support within frame 55. Frame 55 is affixed to door 18 and rear wall 16 to form the fourth side of modular animal kennel 10. Adjustable supports 62 are affixed to uprights 58 to position modular animal kennel 10 above the floor when frame 55 is affixed to modular kennel 10. Threaded T bolts 63 extend through cross bar 56 and are adjusted relative to cross bar 56 by turning.

Reference is now made to FIG. 5, in which a cross-sectional view of removable wall 20 is provided. Removable wall 20 is similar in construction to fixed side wall 14 and is dimensioned to fit within frame 55. The substantial difference between removable wall 20 and side wall 14 being the replacement of a top cross bar and bottom formed beam with a V-shaped receiving member positioned at both the top and bottom of removable wall 20.

More specifically, removable wall 20 includes a bottom V-shaped cross-section track member 65 extending along the length of the wall between uprights 30. Solid wall panel 40 is welded to the edge of V-shaped receiving track 65. A grill 44 is supported on solid wall 40 in the same manner as grill 40 is supported in fixed side wall 14. A top V-shaped cross-section track 68 having along the length thereof is supported between uprights 30 by rods 50 of grill 44 which extend through top flat bar 48. Top V-shaped track 68 is supported on its edge along the length of the edge. As will be described in greater detail below, V-shaped tracks 65, 68 are dimensioned and shaped to receive top surface 34 of formed bar 60 when removable wall 20 is placed within frame 55.

Reference is now made to FIG. 6 wherein a front elevational view of modular kennel 10 is provided in conjunction with the description of door 18. Door 18 includes an outer door frame 70 supported between upright 58 of frame 55 and upright 30 of fixed side wall 14. Outer door frame 70 includes a top cross bar 72 and a bottom cross bar 74 which are connected by respective side bars 76, 78 extending therebetween. Top cross bar 72 and bottom cross bar 74 are formed of hollow tubing while side bars 76, 78 are formed as flat bars. Outer door frame 70 is formed as an integral unit; each adjacent bar being welded with another. Door 18 also includes an inner frame 80 having a top cross bar 82, side bars 84 descending from cross bar 82 at substantially right angles and in parallel and a bottom cross bar 86 extending between side bars 84. Cross bars 82, 86 and side bars 84 are formed as a single unit of hollow tubing welded at respective corners.

A solid panel 88 extends between side bars 84 and is welded to side bars 84 and bottom cross bar 86. A cross bar 90 extends between side bars 84 across the top of solid panel 88. A grill 92 containing rods 94 is positioned between cross bar 90 and cross bar 82 of inner frame 80. Rods 94 are positioned between a top flat bar 91 and a bottom flat bar 93. In the same manner as grill 44, rods 94 extend through flat bars 91, 93 at predetermined intervals and are supported between cross bar 90 and cross bar 82.

Inner frame 80 is mounted on outer door frame 70 by hinges 96 so that door 18 may be pivotably opened to allow an animal handler or owner access to modular kennel 10. Door 18 is maintained closed by a latch 100. A "J" feed chute is mounted on solid panel 88 to allow feeding of an animal within modular kennel 10 without opening door 18.

As shown in FIG. 1, rear wall 16 includes a frame 102 formed of a top cross bar 104, side bars 106 extending parallel and downward from top cross bar 104 at a substantially right angle and bottom cross bar 108 extending between side bars 106. Cross bars 104, 108 and side bars 106 are formed as flat bars in an integral unit. Rods 110 are positioned between top cross bar 104 and bottom cross bar 108 spaced at predetermined intervals. Rods 110 are affixed to top cross bar 104 and bottom cross bar 108 with plug end welds. Intermediate flat bars 111 extend between side bars 106 for greater stability. Rods 110 extend through flat bars 111. The use of rods to form rear wall 16 facilitates observation of animals contained within modular animal kennel 10.

Reference is now made to FIG. 7 in which a sectional view of modular kennel 10 is provided. To form modular kennel 10, side bar 76 of outer door frame 70 is affixed to upright 30 of fixed side wall 14. In an exemplary embodiment a bolt 112 passes through side bar 76 and upright 30 and is held in place by a nut 114. Similarly, the opposed side bar 76 adjacent frame 55 is bolted to upright 58 of frame 55 so that outer door frame 70 of door 18 is supported between fixed side wall 14 and frame 55 of removable wall 20. Similarly, side bar 106 of rear frame 102 is bolted to the rear upright 30 of affixed side wall 14 by a bolt 116 which passes through side bar 106 and upright 30. Bolt 116 is securely maintained by a nut 118. Similarly, rear frame 102 is affixed to frame 55 at its opposite side by a nut and bolt, thus forming the four sides of modular animal kennel 10.

Reference is now made to FIG. 5a in which the forming of a single modular kennel or double modular kennel is depicted. To complete modular kennel 10, a floor 22 is supported between formed beam 32 and formed beam 60. Floor 22 is formed of extended metal having openings 21 therein allowing for urine and feces to drop through floor 22 into a collection pan or to be hosed away. Floor 22 rests between flange 66 of formed beam 60 and flange 38 of formed beam 32.

To form a single unit modular kennel 10, removable wall 20 is positioned within frame 55 such that bottom V-shaped track 65 is positioned to receive top surface 64 of formed beam 60. To anchor removable wall 20 within frame 55, threaded T bolts 63 are turned so that each of them move in the downward direction of arrow A to be received within top V-shaped track 68 of removable door 20. Threaded T bolt 63 is formed with a squared bottom so that a locking fit is provided between threaded T bolt 63 and V-shaped track 68.

To form a two unit modular animal kennel, threaded T bolt 63 is removed from top V-shaped track 68 in the upwards direction of arrow A releasing removable door 20. Removable door 20 is then pivoted out from frame 55 in the direction of arrow B (FIG. 1). A second kennel having three fixed sides and a fourth open side would be affixed to modular animal kennel 10 by bolting the frame of the side walls of the second modular animal kennel to uprights 58 of frame 55 of first modular kennel 10. A second floor 22' (shown in phantom) would then be positioned on flange 59 of formed beam 60 to provide a double unit modular kennel.

By providing a removable intermediate wall which in front elevational view is identical to a fixed side wall, an easily removable wall which provides the appearance of a fixed wall is provided. Additionally, by providing V-shaped tracks at both the top and bottom of the removable wall, the removable wall may be inverted. This allows the wall to be used with a multitude of animals for a multitude of purposes. For example, the grill when placed in the bottom position provides visual contact between animals when the kennel is used in connection with swine. When the solid panel is placed at the bottom of the removable door, the side wall becomes more applicable to animals such as dogs. Additionally, by utilizing a convex surface as the top surface of the formed beam and putting the floor on flanges integrally formed with the beam, the formed beam does not interfere with either floor area when the intermediate removable wall is withdrawn for double unit kennel configurations. Additionally, by providing a sloping surface between the floor and the V-shaped track, no true corners are formed, thus facilitating cleaning of the kennel.

Figure 8:
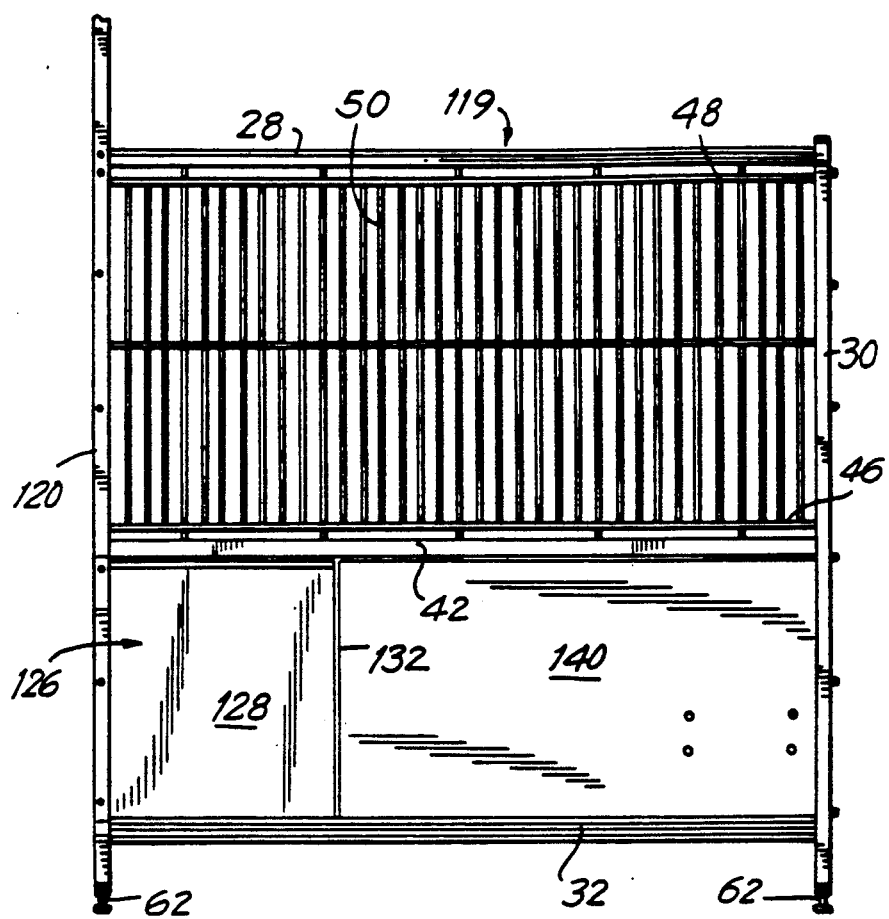
FIG. 8 is a front elevational view of an intermediate side wall constructed in accordance with a second embodiment of the invention.
Figure 9:
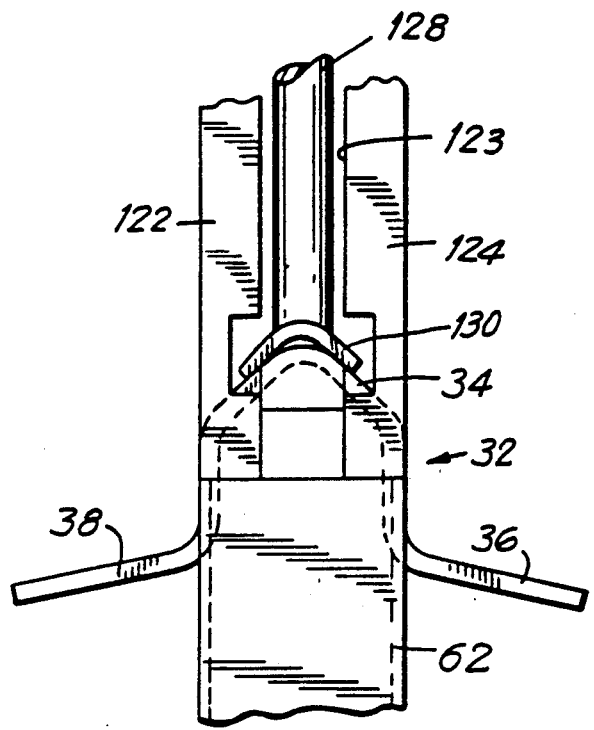
FIG. 9 is a partial side elevational view of an intermediate side wall constructed in accordance with the invention.

Reference is now made to FIGS. 8 and 9 wherein a second embodiment of the animal kennel of the instant invention is provided. Like numerals are utilized to indicate like structure described above, the difference between the above described animal kennel and this embodiment being that removable wall 20 is replaced with a fixed side wall 119 similar to fixed side wall 14 with the addition of a sliding panel within the solid panel portion of fixed side wall 119.

Side wall 119 includes a split frame upright 120 being formed with a front frame 122 and a rear frame 124 with a gap 123 formed therebetween. Side wall 119 includes a solid panel 140 which is permanently affixed between formed bar 32, cross bar 42 and upright 30, but does not completely extend to split frame upright 120. A removable sliding panel 126 includes a solid panel 128 formed on a convex portion of V-shaped track 130. V-shaped track 130 is dimensioned to receive top surface 34 of formed bar 32. A stop bar 132 separates door panel 140 from removable sliding panel 126. Formed beam 32 acts as a guide rail for removable sliding panel 126 which is slid through gap 123 to be removed. When sliding panel 126 is removed, an access door for animals is provided, allowing passage for animals between adjacent units of a kennel when side wall 119 is used as an intermediate wall between adjacent modular units.

It will thus be seen that the objects set forth above, among those made apparent from the preceding description, are efficiently attained and, since certain changes may be made in the above construction without departing from the spirit and the scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A modular animal kennel comprising a plurality of fixed wall means, defining sides of a modular kennel, a frame mounted to said plurality of wall means, removable wall means for being releasably securably supported within the frame without permanent fastening means, the removable wall defining the kennel enclosure, a floor, floor support means integrally formed on at least one of said wall means and one said frame for supporting said floor therebetween, said floor support means including a formed beam having a convex surface, a first flange extending from a first side of the convex surface and a second flange extending from the opposed side of said convex surface forming a smooth concave transition between said at least one wall means, said removable wall and said floor.

2. The modular animal kennel of claim 1, wherein said removable wall is formed with first track means for receiving said floor support means, whereby said floor support means supports and maintains said removable wall within said frame.

3. The modular animal kennel of claim 2, wherein said first track means is a V-shaped member.

4. The modular kennel of claim 1 further comprising releasable anchor means for selectively maintaining said removable wall within the frame.

5. The modular animal kennel of claim 4, wherein said frame includes a cross bar extending across the top of said frame and said releasable anchor means include threaded T bolts which extend through said cross bar.

6. The modular animal kennel of claim 1, wherein at least one of said plurality of fixed walls includes a door.

7. The modular animal kennel of claim 1, wherein said floor is formed with openings therein.

8. The modular animal kennel of claim 1, wherein said frame is formed with adjustable support means for maintaining the kennel above a surface upon which it is supported and at least one of said plurality of fixed walls includes support means for maintaining the kennel above the surface upon which it is supported.

9. The modular animal kennel of claim 1 wherein said first flange and said second flange slope downward and away from the convex surface of said formed beam.

10. A modular animal kennel comprising a plurality of fixed wall means, defining sides of a modular kennel, a frame mounted to said plurality of wall means, removable wall means for being releasably securably supported within the frame without permanent fastening means, the removable wall defining the kennel enclosure, a floor, floor support means integrally formed on at least one of said wall means and on said frame for supporting said floor therebetween, said removable wall being formed with first track means for receiving said floor support means, whereby said floor support means supports and maintains said removable wall within said frame said removable wall being formed with second track means for receiving the floor support means, the first track means being formed at the bottom of said removable wall and said second track means being formed on top of said removable wall.

11. The modular animal kennel of claim 10, further comprising a removable door mounted in said removable wall, said removable door including a solid panel integrally formed with said first track means and a grill mounted on said solid panel, the second track means being mounted on said grill.

12. The modular animal kennel of claim 10, wherein said second track means is a V-shaped member.

13. A modular animal kennel comprising a plurality of fixed wall means, defining sides of a modular kennel, a frame mounted to said plurality of wall means, removable wall means for being releasably securably supported within the frame without permanent fastening means, the removable wall defining the kennel enclosure, a floor, floor support means and on said frame for supporting said floor therebetween, said removable wall being formed with first track means for receiving said floor support means, whereby said floor support means supports and maintains said removable wall within said frame, releasable anchor means for selectively maintaining said removable wall within the frame, said removable wall being formed with second track means for receiving the floor support means, the first track means being formed at the bottom of said removable wall and said second track means being formed on top of said removable wall and said first track means and said second track means being adapted to receive said releasable anchor means.

14. A modular animal kennel having a plurality of fixed wall means, forming the sides of said animal kennel, a floor, floor support means formed on at least two of said fixed wall means for supporting said floor, at least one of said fixed walls formed with said floor support means including slidable panel means for allowing movement of an animal through said wall, said floor support means including a formed beam having a convex surface, a first flange extending from a first side of the convex surface and a second flange extending from the opposed side of said convex surface said at least two of said fixed wall means being supported on said convex surface forming a concave surface between said at least two of said fixed wall means and said floor.

15. The modular animal kennel of claim 14, wherein the at least one of said fixed walls is formed with a frame, the frame including a top cross bar, an upright, a bottom cross bar and a split upright, the split upright having a front member and a rear member and a gap formed therebetween, and the panel means including a sliding panel which passes through said gap.

16. The modular animal kennel of claim 15, wherein said sliding panel includes track means for receiving said floor support means, said floor support means guiding said panel as it is slid through said gap.

17. The modular animal kennel of claim 16, wherein said track means includes a V-shaped member.

* * * * *